US009615343B2

United States Patent
Seo

(10) Patent No.: US 9,615,343 B2
(45) Date of Patent: Apr. 4, 2017

(54) METHOD FOR OBTAINING SYNCHRONIZATION FOR DEVICE-TO-DEVICE COMMUNICATION BETWEEN USER EQUIPMENT INSIDE COVERAGE AREA AND USER EQUIPMENT OUTSIDE OF COVERAGE AREA IN WIRELESS COMMUNICATION SYSTEM, AND APPARATUS FOR SAME

(71) Applicant: LG ELECTRONICS INC., Seoul (KR)

(72) Inventor: Hanbyul Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/649,195

(22) PCT Filed: Dec. 5, 2013

(86) PCT No.: PCT/KR2013/011217
§ 371 (c)(1),
(2) Date: Jun. 2, 2015

(87) PCT Pub. No.: WO2014/088341
PCT Pub. Date: Jun. 12, 2014

(65) Prior Publication Data
US 2015/0351059 A1 Dec. 3, 2015

Related U.S. Application Data

(60) Provisional application No. 61/735,049, filed on Dec. 9, 2012, provisional application No. 61/767,805, filed
(Continued)

(51) Int. Cl.
*H04W 56/00* (2009.01)
*H04W 4/08* (2009.01)
(Continued)

(52) U.S. Cl.
CPC ......... *H04W 56/002* (2013.01); *H04L 5/0048* (2013.01); *H04W 4/08* (2013.01);
(Continued)

(58) Field of Classification Search
CPC . H04W 56/002; H04W 4/08; H04W 56/0025; H04W 72/14; H04W 76/00; H04W 76/023
(Continued)

(56) References Cited

U.S. PATENT DOCUMENTS

2008/0165761 A1 7/2008 Goppner et al.
2012/0163252 A1 6/2012 Ahn et al.
(Continued)

FOREIGN PATENT DOCUMENTS

EP 1976165 3/2008
EP 2903392 9/2013
(Continued)

OTHER PUBLICATIONS

PCT International Application No. PCT/KR2013/011212, Written Opinion of the International Searching Authority dated Apr. 7, 2014, 17 pages.
(Continued)

*Primary Examiner* — Ronald B Abelson
(74) *Attorney, Agent, or Firm* — Lee Hong Degerman Kang Waimey

(57) ABSTRACT

Disclosed in the present invention is a method for a first user equipment inside a coverage area of a base station conducting device-to-device communication with a second user equipment outside the coverage area in a wireless communication system. More specifically, the method comprises the steps of: dividing into a plurality of candidate sections a specific time unit for the device-to-device communication; and transmitting a reference signal for obtaining synchroni-
(Continued)

(a) Control - Plane Protocol Stack (b) User - Plane Protocol Stack zation to the second user equipment from one section from among the candidate sections, when a random number that is generated is bigger than or equal to a critical value corresponding to the inside of the coverage area, wherein the critical value corresponding to the inside of the coverage area is smaller than a critical value corresponding to the outside of the coverage area.

6 Claims, 13 Drawing Sheets

Related U.S. Application Data on Feb. 22, 2013, provisional application No. 61/769,722, filed on Feb. 26, 2013.

(51) Int. Cl.
| | |
|---|---|
| *H04W 72/14* | (2009.01) |
| *H04W 76/00* | (2009.01) |
| *H04W 76/02* | (2009.01) |
| *H04L 5/00* | (2006.01) |
| *H04W 88/08* | (2009.01) |
| *H04W 88/02* | (2009.01) |

(52) U.S. Cl.
CPC ....... *H04W 56/0025* (2013.01); *H04W 72/14* (2013.01); *H04W 76/00* (2013.01); *H04W 76/023* (2013.01); *H04W 88/02* (2013.01); *H04W 88/08* (2013.01)

(58) Field of Classification Search
USPC .......................................... 370/350
See application file for complete search history.

(56) References Cited

U.S. PATENT DOCUMENTS

| | | |
|---|---|---|
| 2012/0163278 A1 | 6/2012 | Chang et al. |
| 2012/0258706 A1 | 10/2012 | Yu et al. |
| 2012/0294245 A1 | 11/2012 | Chang et al. |
| 2014/0112194 A1* | 4/2014 | Novlan ................. H04W 8/005 370/254 |

FOREIGN PATENT DOCUMENTS

| | | |
|---|---|---|
| EP | 2938142 | 10/2015 |
| JP | 2006222489 | 8/2006 |
| JP | 2012244424 | 12/2012 |
| JP | 2013034165 | 2/2013 |
| KR | 10-2008-0058275 | 6/2008 |
| KR | 10-2011-0089311 | 8/2011 |
| KR | 10-2012-0009772 | 2/2012 |
| KR | 10-2012-0073145 | 7/2012 |
| KR | 10-2012-0073147 | 7/2012 |
| KR | 10-2012-0074254 | 7/2012 |
| KR | 10-1165138 | 7/2012 |
| KR | 10-2012-0117726 | 10/2012 |
| KR | 10-2012-0129815 | 11/2012 |
| WO | 2010/097645 | 9/2010 |
| WO | 2012048729 | 4/2012 |
| WO | 2014087719 | 6/2014 |
| WO | 2015065888 | 5/2015 |

OTHER PUBLICATIONS

PCT International Application No. PCT/KR2013/011217, Written Opinion of the International Searching Authority dated Apr. 7, 2014, 18 pages.
European Patent Office Application No. 13860601.7, Search Report dated Aug. 16, 2016, 6 pages.
European Patent Office Application Serial No. 13859913.9, Search Report dated Dec. 2, 2016, 7 pages.

* cited by examiner

FIG. 2
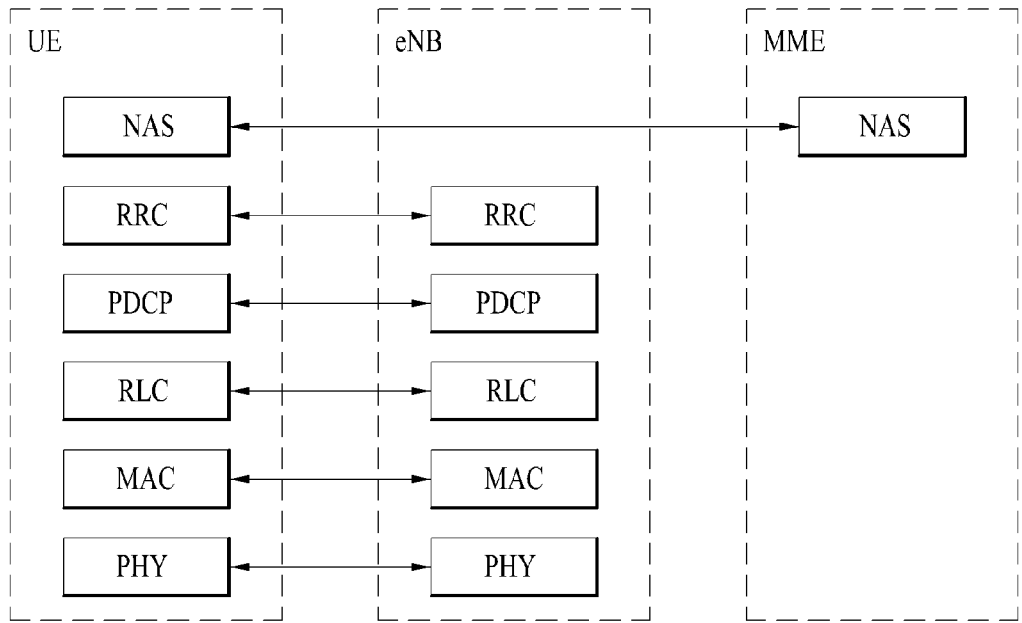
(a) Control - Plane Protocol Stack
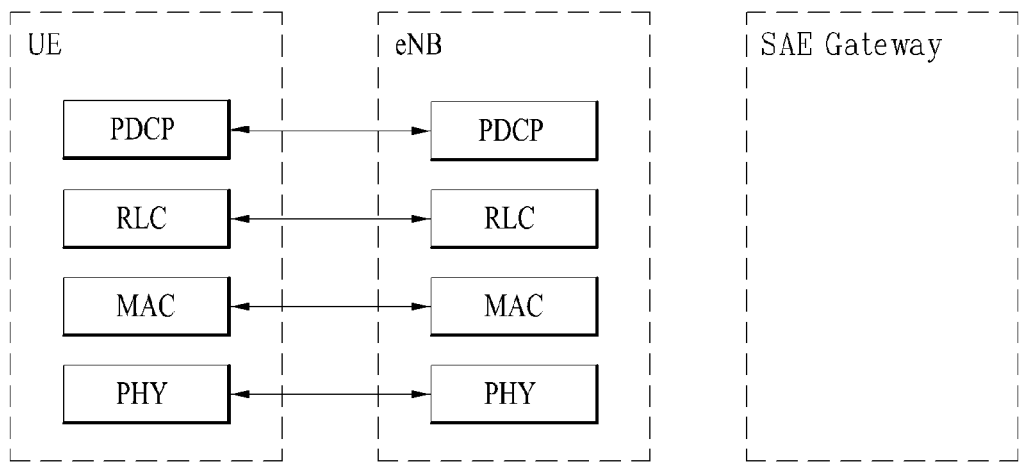
(b) User - Plane Protocol Stack

METHOD FOR OBTAINING SYNCHRONIZATION FOR DEVICE-TO-DEVICE COMMUNICATION BETWEEN USER EQUIPMENT INSIDE COVERAGE AREA AND USER EQUIPMENT OUTSIDE OF COVERAGE AREA IN WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2013/011217, filed on Dec. 5, 2013, which claims the benefit of U.S. Provisional Application No. 61/735,049, filed on Dec. 9, 2012, 61/767,805, filed on Feb. 22, 2013 and 61/769,722, filed on Feb. 26, 2013, the contents of which are all hereby incorporated by reference herein in their entirety.

TECHNICAL FIELD

The present invention relates to a wireless communication system, and more particularly to a method and apparatus for acquiring synchronization for Device-to-Device (D2D) direct communication between a user equipment (UE) located inside a coverage region and a user equipment (UE) located outside the coverage region in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention is to provide a method and apparatus for acquiring synchronization for Device-to-Device (D2D) direct communication between a user equipment (UE) located inside a coverage region and a user equipment (UE) located outside the coverage region in a wireless communication system.

Technical Solution

The objects of the present invention can be achieved by providing a method for performing Device-to-Device (D2D) direct communication between a first user equipment (UE) located inside a base station (BS) coverage and a second user equipment (UE) located outside the coverage in a wireless communication system including: dividing a specific time unit for the D2D direct communication into a plurality of candidate sections; and in one section from among the candidate sections, generating a random number, and transmitting a reference signal (RS) for synchronization acquisition to the second UE when the random number is equal to or higher than a threshold value corresponding to the inside of the coverage, wherein the threshold value corresponding to the inside of the coverage is less than a threshold value corresponding to the outside of the coverage. The one section may prevent the second UE located outside the coverage from transmitting the reference signal (RS).

The method may further include: receiving a triggering message for transmission of the reference signal (RS) for the synchronization acquisition from the base station (BS).

The transmitting the reference signal (RS) for synchronization acquisition to the second UE may include: transmitting the reference signal (RS) for the synchronization acquisition to the second UE at a specific time determined on the basis of either an uplink transmission (Tx) time ranging from the first UE to the base station (BS) or a downlink reception (Rx) time ranging from the base station (BS) to the first UE. The transmitting the reference signal (RS) for synchronization acquisition to the second UE may include: transmitting the reference signal (RS) for synchronization acquisition to the second UE at an intermediate time between an uplink transmission (Tx) time ranging from the first UE to the base station (BS) and a downlink reception (Rx) time ranging from the base station (BS) to the first UE.

The second UE, after reception of the reference signal (RS), may transmit the received reference signal (RS) to one or more other UEs located outside the coverage either in a last section from among the candidate sections or in a next time unit of the specific time unit.

In accordance with another aspect of the present invention, a user equipment (UE) device for performing Device-to-Device (D2D) direct communication in a wireless communication system includes: a radio frequency (RF) module configured to transmit/receive a signal to/from a base station (BS) or counterpart user equipment (UE) devices of the D2D direct communication; a processor configured to process the signal, wherein the processor controls the RF module in such a manner that it divides a specific time unit for the D2D direct communication into a plurality of candidate sections; in one section from among the candidate sections, generating a random number, and transmitting a reference signal (RS) for synchronization acquisition to a user equipment (UE) located outside a coverage of the base station (BS) when the random number is equal to or higher than a threshold value corresponding to the inside of the coverage, wherein the threshold value corresponding to the inside of the coverage is less than a threshold value corresponding to the outside of the coverage. The one section may prevent the user equipment (UE) located outside the coverage from transmitting the reference signal (RS).

The radio frequency (RF) module may receive a triggering message for transmission of the reference signal (RS) for synchronization acquisition from the base station (BS).

The processor may determine a transmission (Tx) time for transmitting the reference signal (RS) for synchronization acquisition on the basis of either an uplink transmission (Tx) time toward the base station (BS) or a downlink reception (Rx) time from the base station (BS). The processor may determine a transmission (Tx) time for transmitting the reference signal (RS) for synchronization acquisition to be an intermediate time between an uplink transmission (Tx) time toward the base station (BS) and a downlink reception (Rx) time from the base station (BS).

The user equipment (UE) located outside the coverage of the base station (BS), after reception of the reference signal (RS), may transmit the received reference signal (RS) to one or more other UEs located outside the coverage either in a last section from among the candidate sections or in a next time unit of the specific time unit.

Advantageous Effects

According to exemplary embodiments of the present invention, the method and apparatus for acquiring synchronization can more efficiently acquire synchronization for Device-to-Device (D2D) communication between a user equipment (UE) located inside a coverage region and a user equipment (UE) located outside the coverage region in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

BEST MODE

Figure 1:
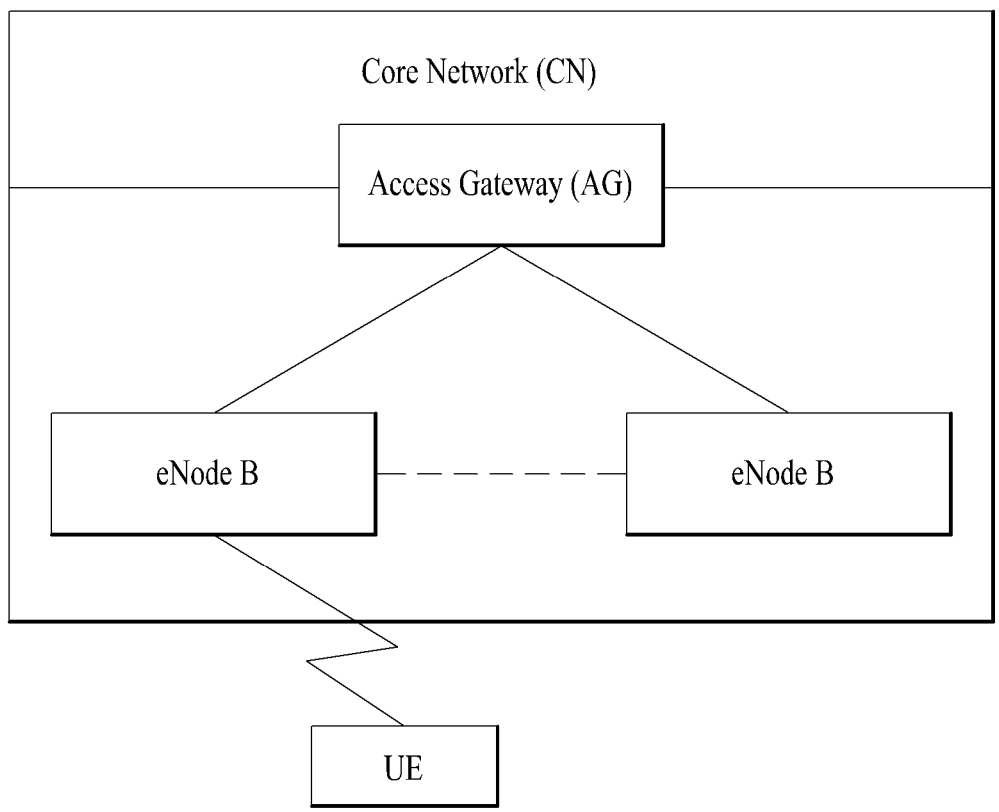
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
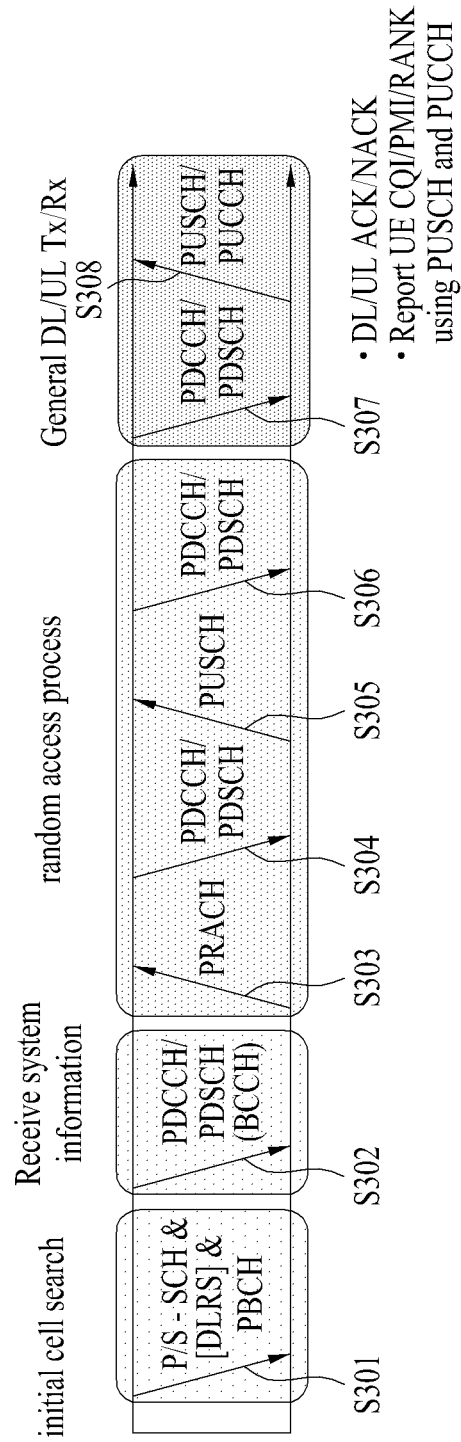
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
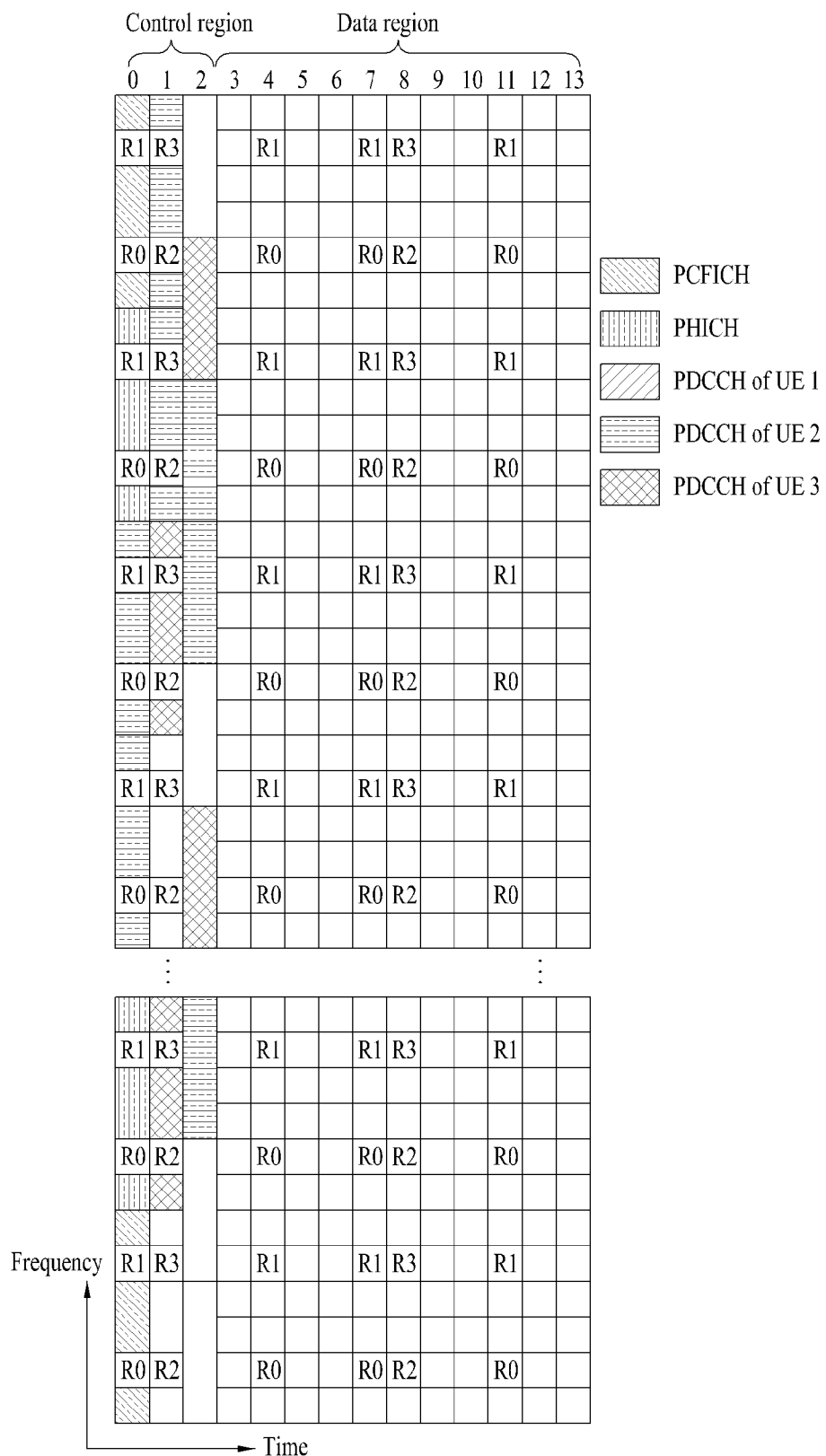
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
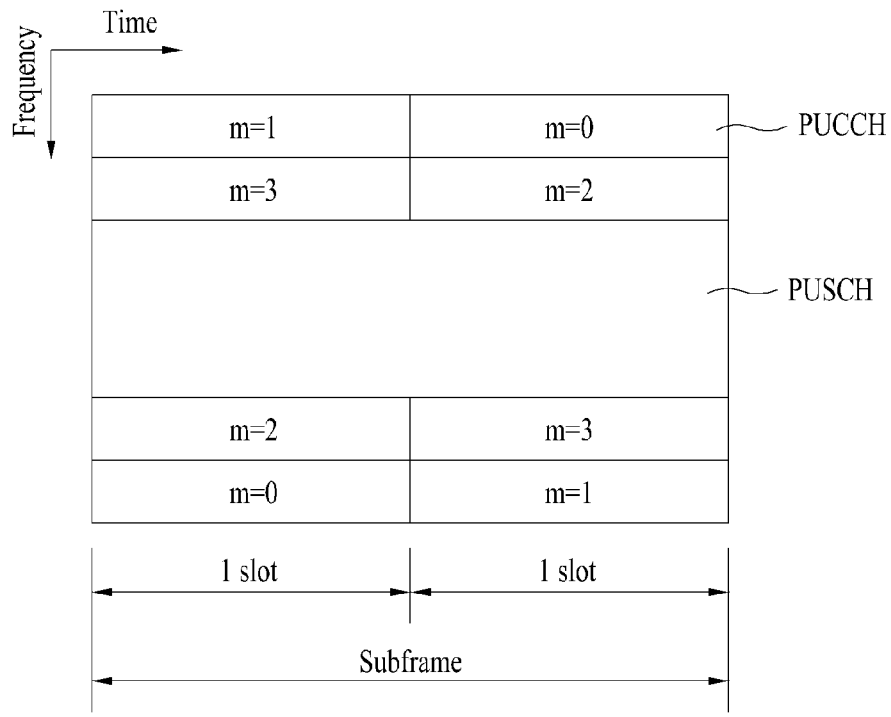
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A basic resource unit of a DL control channel is an REG. The REG includes four contiguous REs except for REs carrying RSs. A PCFICH and a PHICH include 4 REGs and 3 REGs, respectively. A PDCCH is configured in units of a Control Channel Element (CCE), each CCE including 9 REGs.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
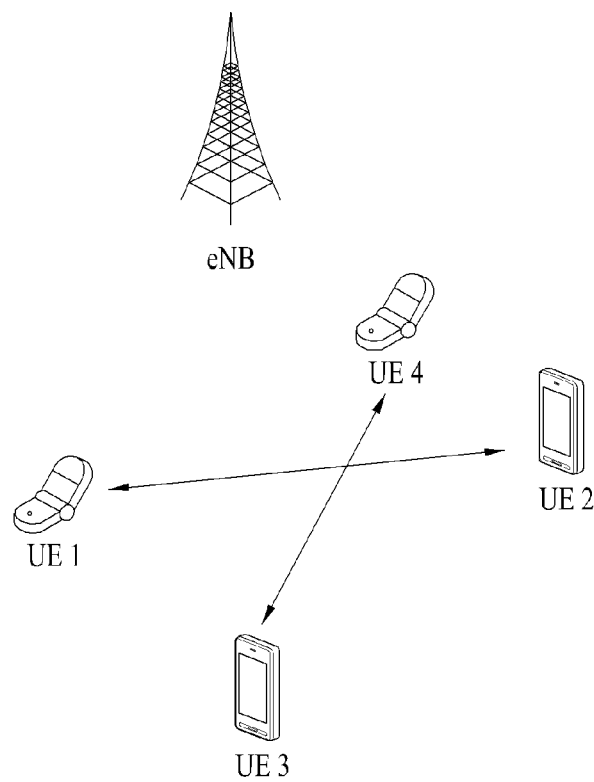
FIG. 6 is a diagram illustrating the concept of device-to-device (D2D) communication.

FIG. 6 is a diagram illustrating the concept of device-to-device (D2D) communication.

Referring to FIG. 6, UE1 and UE2 may perform D2D direct communication therebetween, and UE3 and UE4 may also perform D2D direct communication therebetween. The eNB may control the position of time/frequency resources, Tx power, etc. for UE-to-UE direct communication through an appropriate control signal. However, if UEs are located at the outside of an eNB coverage, UE-to-UE direct communication may be achieved without using the eNB control signal. For convenience of description, UE-to-UE direct communication will hereinafter be referred to as D2D (Device-to-Device) communication.

Figure 7:
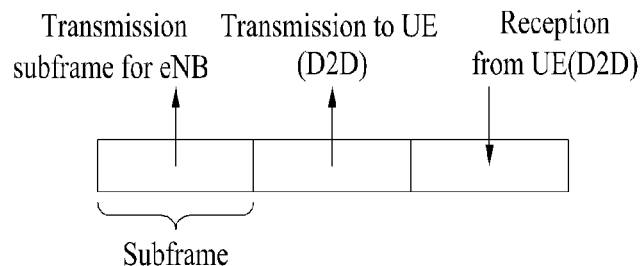
FIG. 7 illustrates classification of subframes for D2D communication and eNB communication.

UE located in the eNB coverage must communicate with the eNB simultaneously while performing D2D communication. One method for this purpose is to classify all subframes into subframes for eNB communication and subframes for D2D communication. FIG. 7 illustrates classification of subframes for D2D communication and eNB communication.

Referring to FIG. 7, a UE configured to perform D2D communication using an uplink band of an FDD system transmits an uplink signal to the eNB at a first subframe shown in FIG. 7, transmits a D2D signal to another UE at a second subframe, and receives a D2D signal from another UE at a third subframe. Through the above-mentioned operation, the interference problem encountered between D2D communication and eNB communication can be solved, and D2D communication has Tx/Rx structures on a subframe basis and can be easily multiplexed with the eNB communication in a time domain.

In this case, if D2D communication has the Tx/Rx structure on a subframe basis, this means that a time domain occupied by one D2D Tx signal is a time domain occupied by one subframe, and a basic time unit in which the UE transmits or receives the D2D signal is used as one subframe. Needless to say, concatenation of plural subframes may be achieved in units of a basic time as necessary.

Meanwhile, the situation in which D2D communication has a subframe-based structure may be efficiently used even when a UE located outside of the eNB coverage performs D2D communication. For example, even when a specific UE is located outside of the eNB coverage, the subframe-based structure has an advantage in that a UE acting as a target object of D2D communication can communicate with the eNB using some subframes contained in the eNB coverage. In addition, even when all D2D UEs are located outside of the eNB coverage, the subframe-based structure has an advantage, because communication is achieved in a manner that different D2D links occupy different subframes when several D2D communication links are contiguous to each other as shown in FIG. 6, resulting in avoidance of mutual interference.

In order to perform D2D communication on a subframe basis, a boundary position at which the subframe begins must be definitely recognized by UEs participating in D2D communication. As a general method for recognizing the subframe boundary, a reference signal (hereinafter referred to as a subframe reference signal) having unique attributes indicating the subframe boundary is transmitted, and the UEs having received the reference signal can derive the subframe boundary from the corresponding subframe reference signal (RS) position. For example, a specific position spaced apart from a reception (Rx) time of the subframe RS by a predetermined distance may be determined to be the subframe boundary.

If D2D UE is located in the eNB coverage, the eNB can transmit this subframe RS. Specifically, the subframe RS transmitted from the eNB is not separately transmitted for D2D, and the subframe RS may be transmitted to configure the subframe position of the legacy eNB-UE communication. That is, a UE located in the eNB coverage may receive a specific signal from the eNB so as to initially access the eNB. In the case of the LTE system, it is assumed that the UE located in the eNB coverage may receive a primary synchronization signal (PSS) and/or a secondary synchronization signal (SSS) and may recognize a boundary of a subframe managed by the eNB using the PSS or SSS, so that this subframe boundary may be applied to D2D communication without change or may be modified according to a predetermined rule and then applied to D2D communication.

In contrast, if D2D UE is located outside of the eNB coverage, it is impossible to perform the above-mentioned operation. Thus, the UE must directly transmit the subframe RS in such a manner that the subframe boundaries between D2D UEs are identical to each other.

First Embodiment

A method for allowing the UE to transmit the subframe RS will hereinafter be described in detail.

If the UE transmits the subframe RS, it is preferable that one subframe RS be transmitted among contiguous UEs. For this purpose, when a specific UE attempts to transmit the subframe RS, the presence or absence of a subframe RS transmitted from another UE is confirmed at the initially designated time point. The first embodiment proposes a method for transmitting the subframe RS at a predetermined probability only when the subframe RS transmitted from another UE is not present. That is, several UEs observe the position of subframe RS candidates. If each UE does not detect any subframe RS at a previous candidate position, the UE attempts to transmit the subframe RS with a predetermined probability at the next candidate position.

Figure 8:
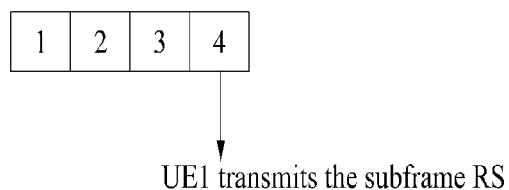
FIG. 8 illustrates a method for transmitting a subframe reference signal (RS) according to a first embodiment of the present invention.

FIG. 8 illustrates a method for transmitting a subframe reference signal (RS) according to a first embodiment of the present invention.

Referring to FIG. 8, it can be recognized that no subframe RS is transmitted at candidate positions (1, 2, 3) for transmission of the subframe RS, because RS transmission at all UEs is not achieved in the step of deciding whether stochastic transmission is performed. At the candidate position 4, UE1 determines transmission at the stochastic transmission/non-transmission decision step, so that UE1 can transmit the subframe RS. In addition, UEs having received the subframe RS from another UE may regard the corresponding RS as only one RS during at least a predetermined time, and it is preferable that additional attempts to transmit the subframe RS be stopped.

The above-mentioned operation in which only one UE from among several UEs configured to stochastically transmit the subframe RS can perform final transmission will hereinafter be referred to as the subframe RS transmission scheme based on UE-to-UE competition. Various methods for implementing the UE-to-UE competition based subframe RS transmission scheme may include the following first and second methods (1) and (2).

1) In the process of deciding whether stochastic transmission is achieved, random numbers are generated according to a predetermined rule at each Tx candidate position. If each of the random number is higher than (or less than) a reference value decided by a given transmission probability, UEs can operate to transmit the reference signal.

2) Alternatively, random numbers are generated and stored according to a predetermined rule (that is present between a predetermined minimum value and a maximum value) at an initial candidate position. If the subframe RS is not transmitted at each candidate position, a predetermined value is subtracted from the stored value and the subtraction result is stored again. If the stored value is equal to or less than a predetermined reference by repetition of such subtracting and storing actions, UEs may operate in such a manner that the subframe RS can be transmitted.

If the subframe RS is transmitted according to the above-mentioned rule, all D2D UEs having received the subframe RS may determine the position of the subframe boundary on the basis of the received subframe RS. D2D UE having transmitted the subframe RS assumes that the subframe RS transmitted from the D2D UE has been transferred to contiguous UEs, such that the position of subframe boundary is decided. A detailed example of the subframe RS transmission scheme based on UE-to-UE competition will be given below.

Figure 9:
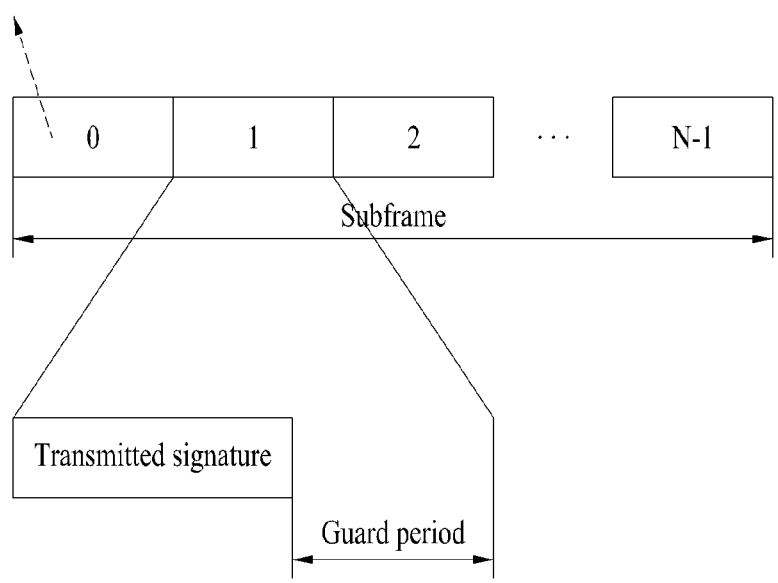
FIG. 9 illustrates the positions of subframe reference signal (RS) transmission candidates from the viewpoint of one UE according to a first embodiment of the present invention.

FIG. 9 illustrates the positions of subframe reference signal (RS) transmission candidates from the viewpoint of one UE according to a first embodiment of the present invention. Specifically, FIG. 9 illustrates that a time period corresponding to one subframe is composed of a total of N candidate positions ranging from 0 to N−1.

Referring to FIG. 9, one candidate position for subframe RS transmission may include a transmission period of a signature of a real reference signal (RS) and a guard period configured to guarantee a specific time needed for switching to the Rx position at the next candidate position after completion of transmission. In this case, the guard period may be omitted if the switching time to the Rx operation is unnecessary.

Especially, the frequency position of a reference signal (RS) transmitted at each candidate position by a UE and/or the signature may be determined by an index of the candidate position. For example, the signature of the RS transmitted at the candidate position (n) may be prescribed to be transmitted in a frequency domain corresponding to the corresponding candidate position, and the signature having been transmitted at another candidate position and the signature of the RS having been transmitted at the candidate position (n) may occupy different frequency domains. In addition, the signature of the RS having been transmitted at the candidate position (n) may be prescribed to use a sequence different from those of other candidate positions. For example, the index (n) of the candidate position may be contained in a specific value for initializing the sequence of the signature. Of course, information regarding a predetermined number of bits is added to the subframe RS so that the candidate position can be indicated.

Through the above-mentioned operation, a UE having received the signature of a specific subframe RS may allow another UE having transmitted the corresponding signature to recognize which candidate position is associated with the corresponding signature from the viewpoint of a UE having transmitted the corresponding signature, as well as to recognize which candidate position is a transmission position of the corresponding signature. Therefore, the reception (Rx) UE may recognize the subframe boundary from the viewpoint of the corresponding Tx UE on the basis of the Rx time of the corresponding signature and the candidate position index of the corresponding signature.

Meanwhile, some last candidate positions may be used to transmit a validation signal indicating whether the subframe RS is successfully transmitted. That is, assuming that a specific D2D UE has successfully received the subframe RS at the internal candidate position of a specific subframe, the validation signal is transmitted at the last candidate position so as to inform the transmission UE of successful reception. Transmission of such validation signal may have a relay effect of the subframe RS. In addition, the validation signal may not always be transmitted at the same subframe as the subframe RS, or may not always be transmitted at the last candidate position. The validation signal may be transmitted at a predetermined candidate position or may also be transmitted after successful transmission of the subframe RS.

Figure 10:
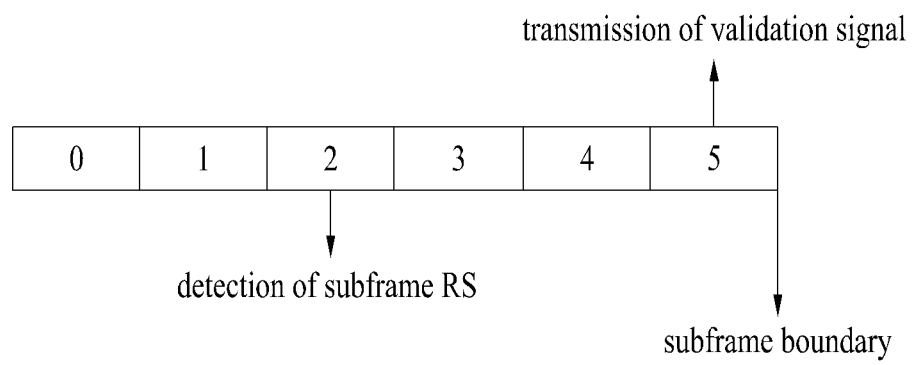
FIG. 10 illustrates reception of a subframe reference signal (RS) and transmission of a validation signal according to a first embodiment of the present invention.

FIG. 10 illustrates reception of a subframe reference signal (RS) and transmission of a validation signal according to a first embodiment of the present invention.

Referring to FIG. 10, under the condition that one subframe is composed of a total of 6 candidate positions, a UE may receive the subframe RS at the candidate position 2. After lapse of three candidate positions, the UE may recognize the appearance of a new subframe boundary. Thereafter, the UE may transmit the validation signal at the candidate position 5 indicating the last candidate position of the corresponding subframe.

The validation signal may be identical in structure to the subframe RS. For distinction of the validation signal, the validation signal may occupy the frequency position and/or may be discriminated on the signature in association with other subframe RSs. A UE (i.e., a head UE) having transmitted the subframe RS at a specific subframe may determine that the subframe RS has been successfully transmitted on the condition that the validation signal of the corresponding subframe is detected, and thus D2D communication is carried out in response to the subframe boundary.

Specifically, all or some UEs having received the subframe RS may simultaneously transmit the validation signal. In this case, the validation signal may be configured in the form of overlap of several UE transmission signals, so that the validation signal may be transmitted at higher power. If a specific UE does not receive the subframe RS at a specific subframe and receives the validation signal for the subframe RS at the specific subframe, the subframe boundary may be established on the basis of the validation signal. However, there is a possibility that a specific UE from among UEs having received the subframe RS receives different subframe RSs having higher power. This specific UE may not participate in simultaneous transmission of the validation signal. The above-mentioned situation may indicate that a UE can select one of several subframe RSs having been received by the UE and transmit the validation signal corresponding to the selected subframe RS. The UE having transmitted the subframe RS may assume that the reference signal (RS) having been transmitted from the UE has been received with available maximum power.

Figure 11:
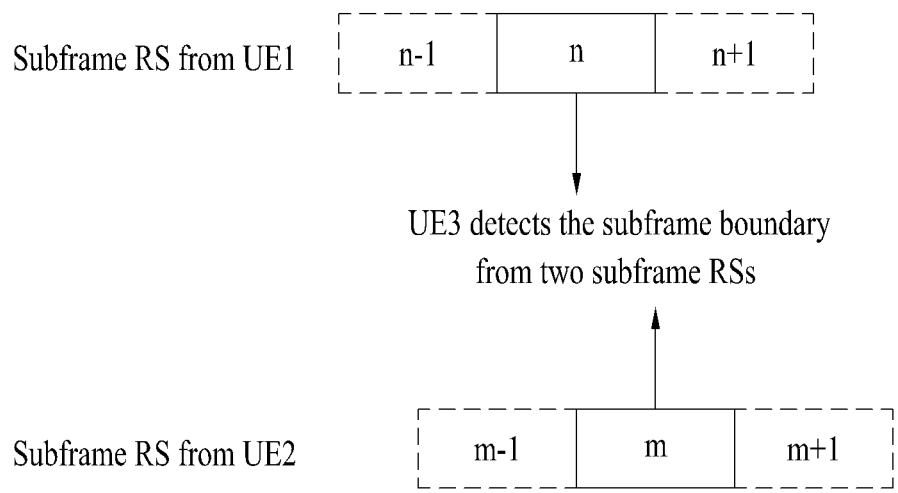
FIG. 11 is a conceptual diagram illustrating an exemplary case of receiving a plurality of overlapped subframe reference signals (RSs) according to a first embodiment of the present invention.

A specific UE may receive a plurality of subframe RSs overlapping with each other at intervals of a long time difference within a specific subframe, and a detailed description thereof will hereinafter be given with reference to the attached drawings. FIG. 11 is a conceptual diagram illustrating an exemplary case of receiving a plurality of overlapped subframe reference signals (RSs) according to a first embodiment of the present invention.

In this case, the UE may recognize the occurrence of a reception failure of the subframe RS (i.e., collision of the subframe RS), so that the UE may not transmit the validation signal. Alternatively, a non-validation signal indicating the occurrence of collision between the subframe RSs may also be transmitted.

The subframe RS transmission UEs, that have not received the validation signal or have received the non-validation signal, may assume failure of subframe boundary acquisition within the corresponding subframe, and may re-perform the competition-based subframe RS transmission within the next subframe. Under the condition that a specific UE transmits the subframe RS, does not receive the validation signal corresponding to its own Tx signal, and receives the validation signal corresponding to another subframe RS, the subframe boundary may be formed in response to the received validation signal.

Meanwhile, according to another method for transmitting the validation signal when the competition-based subframe RS transmission scheme is used, if a specific UE has received the subframe RS valid at the candidate position (n), the subframe RSs having the same attributes as those of the corresponding subframe RS may be transmitted at all the subsequent candidate positions (i.e., candidate positions n+1, n+2, etc.). Assuming that one specific UE from among a plurality of competitive UEs of one group initially transmits the subframe RS, all the remaining UEs having received the subframe RS may simultaneously transmit the same subframe RS at the subsequent candidate positions, such that the subframe RS can be propagated to a wider region.

Second Embodiment

Meanwhile, the above-mentioned subframe RS transmission scheme based on UE-to-UE competition may be efficiently used when all UEs are located outside of the eNB coverage. Therefore, the competition-based subframe RS transmission scheme can be applied only to the case in which the UE is located outside of the eNB coverage. In the case of the UE located in the eNB coverage, the competition-based subframe RS transmission scheme may be applied only to the case in which the use of UE-to-UE competition based subframe RS transmission scheme is explicitly indicated.

The fact that the UE is located outside of the eNB coverage may indicate a first case (a) in which PSS/SSS transmitted from the eNB is not detected at a specific carrier, or a second case (b) in which maximum RSRP and/or RSRQ measured at the specific carrier may be equal to or less than a specific reference value.

In this case, the specific carrier is a carrier needed for D2D communication. Specifically, if D2D communication is performed in a downlink carrier of the FDD system, or if D2D communication is performed in a carrier connected to the carrier needed for the D2D communication (i.e., if D2D communication is performed in an uplink carrier of the FDD system), the specific carrier may be a downlink carrier paired with the uplink carrier at which the corresponding D2D communication is scheduled to be executed. Alternatively, if it is impossible to access the eNB through any carrier, a reference may also be changed to the case in which the UE satisfies the above-mentioned condition in all carriers capable of being received, so that the UE-to-UE competition based subframe RS transmission scheme can be restricted.

If some UEs are located in the eNB coverage, and if a UE configured to perform D2D communication with the corresponding UE establishes the subframe boundary on the basis of an arbitrary time at the outside of the eNB coverage, it becomes difficult to perform the above-mentioned operations. Preferably, the subframe boundary for D2D communication of the corresponding UE may be identical to that for the eNB communication. The present invention may allow a UE located in the eNB coverage to have priority over the other UE located outside of the eNB coverage in terms of subframe RS transmission. For such priority assignment, the following methods (a) and (b) may be used.

a) First of all, there may be a low possibility that the UE located outside of the eNB coverage transmits the subframe RS, and there may be a high possibility that the UE located in the eNB coverage transmits the subframe RS. The method (a) may be implemented according to the method (1) from among the competition-based subframe RS transmission methods. In more detail, a reference value used by a UE located outside of the eNB coverage may be adjusted to be less than a reference value used by the other UE located in the eNB coverage (when the subframe RS is transmitted using random numbers each of which is less than a reference value), or may be adjusted to be higher than the reference value used by the other UE located in the eNB coverage (when the subframe RS is transmitted using random numbers each of which is higher than a reference value), such that this method (a) can be implemented. If the method (a) is applied to the method (2) from among the competition-based subframe RS transmission methods, a maximum random number generated from the UE located outside of the eNB coverage is adjusted to be higher than a maximum random number generated from the other UE located in the eNB coverage, so that the method (a) can be implemented.

b) Alternatively, the UE located outside of the eNB coverage does not transmit the subframe RS at some initial Tx candidate positions, such that the corresponding candidate position may be used for the Tx operation of the UE located in the eNB coverage. If this method (b) is applied to the method (a) from among the competition-based subframe RS transmission methods, the method (b) may be implemented by setting the value of 0 to the Tx probability of the UE located outside of the eNB coverage at some initial candidate positions. If the method (b) is applied to the method(s) from among the competition-based subframe RS transmission methods, a minimum random number generated from the UE located outside of the eNB coverage may be adjusted to be higher than a minimum random number generated from the other UE located in the eNB coverage, so that the method (b) can be implemented. In addition, a minimum random number generated from the UE located outside of the eNB coverage may be adjusted to be equal to or higher than a minimum random number generated from the other UE located in the eNB coverage, so that the UE located outside of the eNB coverage may always perform transmission after completion of the operations of the UE located in the eNB coverage.

In addition, assuming that a valid period is present when a selected subframe RS is used, UEs may re-transmit the subframe RS on the basis of competition, after the corresponding valid period has expired. In this case, an expiration time of the valid period may be immediately set to the start time of the subframe RS transmission time candidate positions. In the case of using the method (1) from among the competition-based subframe RS transmission methods, if the UE generates a random number value and does not transmit the RS at the candidate position, the UE may begin to reduce the random number value as soon as the valid period of a previous RS has expired. In the case of using the method (2) from among the competition-based subframe RS transmission methods, the UE having low priority and located outside of the eNB coverage may not transmit the subframe RS during a predetermined time starting from the expiration time of the valid time of a subframe RS used as a legacy reference.

Third Embodiment

Meanwhile, the UE located in the eNB coverage can acquire the subframe boundary on the basis of the signal transmitted from the eNB as described above, but there is a need for the UE located in the eNB coverage to transmit the subframe RS in such a manner that the other UE located outside of the eNB coverage can obtain the same subframe boundary. For this purpose, the eNB may command a specific UE to transmit the subframe RS through higher layer signaling such as RRC signaling.

This transmission indication may be classified into direct indication and indirect indication. The direct indication may explicitly indicate the position of time/frequency resources of the subframe RS, the signature information of RS, Tx power, etc., that are scheduled to be transmitted from the corresponding UE to a specific UE. The indirect indication may allow the eNB to transmit the subframe RS to either a specific UE or a UE group composed of some UEs according to the competition-based subframe RS transmission method. This indirect indication may include attributes of the subframe RS, for example, the position of time/frequency resources of the RS, the signature information of the RS, Tx power, etc.

After the UE located in the eNB coverage receives the transmission (Tx) indication of the eNB, the UE may transmit the subframe RS according to the received Tx indication. Downlink resources are excessively interfered with by high Tx power of the eNB, so that an arrival region of the subframe RS may be excessively limited, and UL resources may be used as the subframe RS transmission resources.

Figure 12:
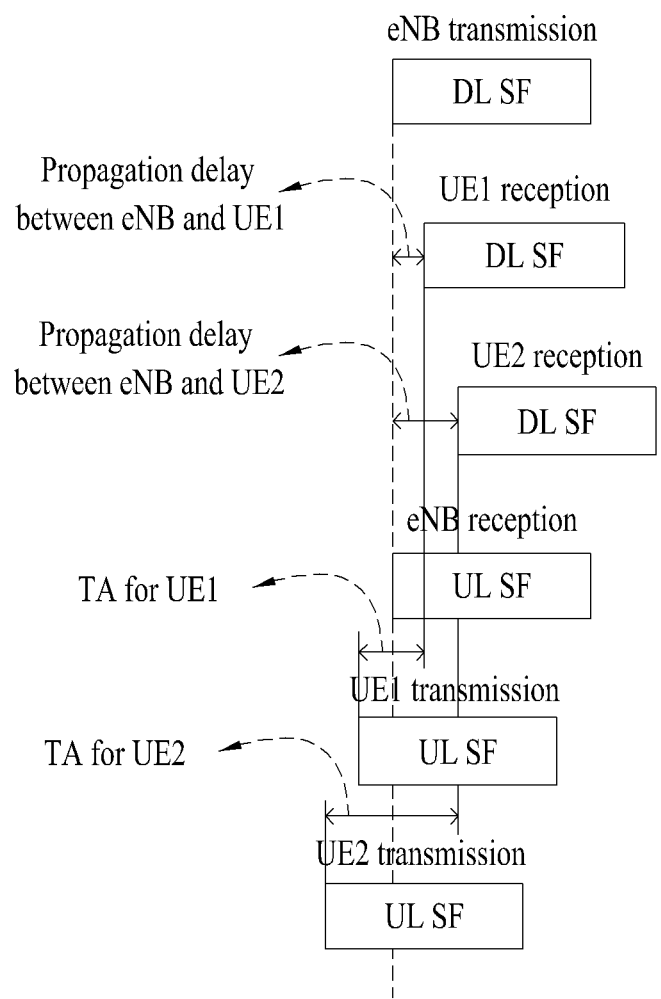
FIG. 12 is a conceptual diagram illustrating that a boundary of a downlink subframe and a boundary of an uplink subframe are changed according to a third embodiment of the present invention.

A start point of the UL subframe is adjusted according to different timing advance values of individual UEs so as to offset the propagation delay between the eNB and the UE, and thus Tx signals of several UEs can arrive at the eNB at the same time point. As a result, a boundary of a downlink subframe of the UE located in the eNB coverage is different from a boundary of an uplink subframe of the UE located in the eNB coverage. FIG. 12 is a conceptual diagram illustrating that a boundary of a downlink subframe and a boundary of an uplink subframe are changed according to a third embodiment of the present invention.

In this case, the UE having received a transmission indication message of the subframe RS from the eNB has to determine which one of the DL subframe boundary and the UL subframe boundary will be used for transmission of the subframe RS. One of the following subframe RS transmission time decision methods may be used as necessary.

i) As a first subframe RS transmission (Tx) time decision method, the subframe RS transmission time may be determined on the basis of the DL subframe boundary.

A reference signal (RS) transmitted from the UE may be transmitted at the boundary position of the DL subframe received by the UE, or may be transmitted at a specific position shifted from the DL subframe boundary position by a predetermined time.

Figure 13:
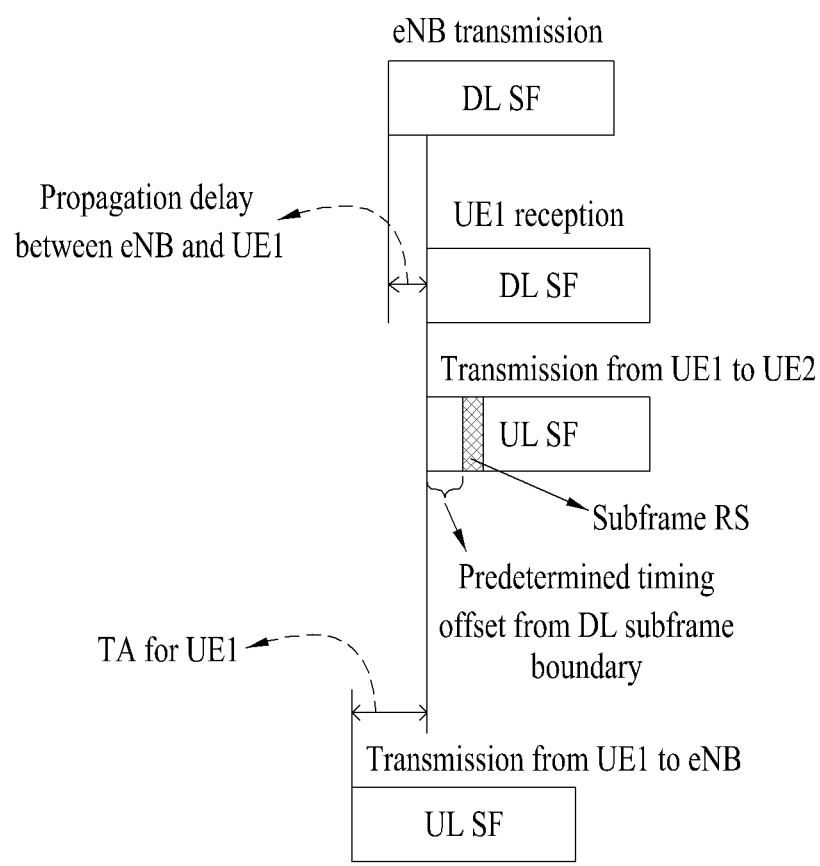
FIG. 13 is a conceptual diagram illustrating a method for determining a transmission (Tx) time of a subframe reference signal (RS) using a boundary of a downlink subframe according to a third embodiment of the present invention.

FIG. 13 is a conceptual diagram illustrating a method for determining a transmission (Tx) time of a subframe reference signal (RS) using a boundary of a downlink subframe according to a third embodiment of the present invention. Specifically, FIG. 13 illustrates that the subframe RS is delayed from the DL subframe boundary position by a predetermined time (i.e., offset), and is then transmitted. In FIG. 13, it is assumed that UE1 located in the coverage transmits the subframe RS to a UE2 located outside of the coverage. Of course, the subframe RS may also be transmitted at a specific time earlier than a predetermined time (i.e., offset) on the basis of the DL subframe boundary without departing from the scope or spirit of the present invention.

The above-mentioned scheme has an advantage in that the boundary position of the DL subframe of the UE (having transmitted the corresponding subframe RS) located in the coverage can be recognized by other UEs located outside of the coverage. Specifically, in the case of using a TDD system, when the signal transmitted from an external UE of the coverage for D2D communication may cause strong interference to the internal UE of the coverage when the internal UE of the coverage receives the DL signal. In this case, assuming that the external UE of the coverage can recognize the DL subframe boundary position of the internal UE of the coverage, downlink signal reception of the internal UE of the corresponding coverage can be more efficiently protected, and a detailed description thereof will hereinafter be given with reference to the attached drawings.

Figure 14:
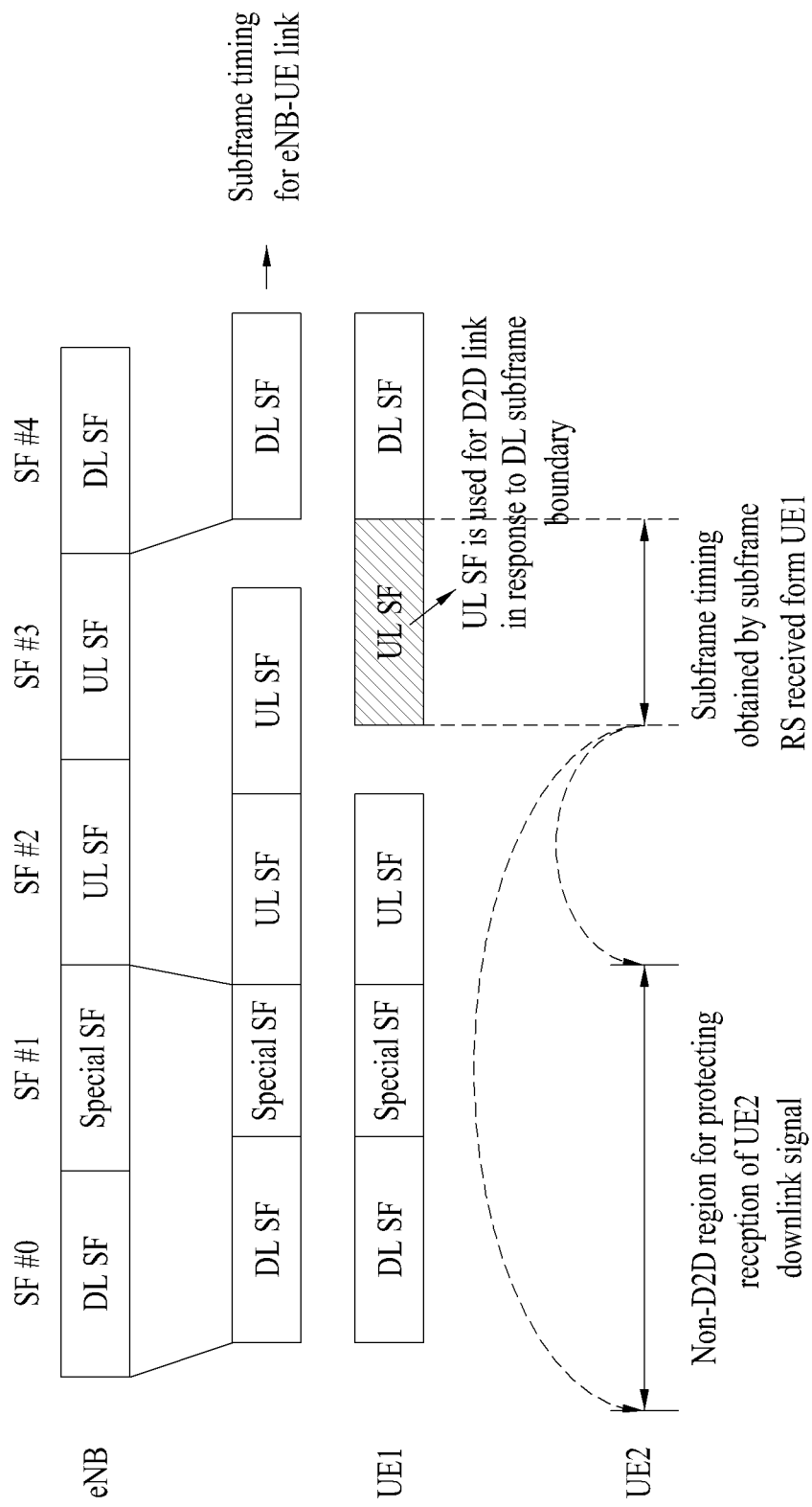
FIG. 14 is a conceptual diagram illustrating another method for determining a transmission (Tx) time of a subframe reference signal (RS) using a boundary of a downlink subframe according to a third embodiment of the present invention.

FIG. 14 is a conceptual diagram illustrating another method for determining a transmission (Tx) time of a subframe reference signal (RS) using a boundary of a downlink subframe according to a third embodiment of the present invention.

Referring to FIG. 14, transmission of a D2D signal is excluded in a predetermined time section derived from the subframe boundary position received by the external UE of the coverage, so that reception of the important DL signals of the internal UE of a contiguous coverage can be protected. Alternatively, during the corresponding time section, D2D transmission power may be reduced by a predetermined offset, or maximum Tx power may be set to lower power, DL signal reception of the internal UE of the coverage can be protected but the D2D communication with a contiguous UE located very close to the internal UE may be allowed.

In FIG. 14, UE1 may readjust the subframe #3 in response to the DL subframe boundary, and may use the subframe #3 for transmission of the subframe RS. UE2 located outside of the coverage may acquire an estimation value of the DL subframe boundary of UE1, and may not apply a time section decided by a predetermined rule on the basis of the corresponding estimation value to D2D communication, such that UE1 may easily receive the DL signal at the subframe #1 and the subframe #2. In this case, the section unused for D2D communication may repeatedly appear.

In addition, if the subframe RS is transmitted in response to the DL subframe boundary as described above, a subsequent D2D Tx/Rx signal may also be transmitted and received on the basis of the DL subframe boundary. Specifically, the subsequent D2D Tx/Rx signal may also be applied to the D2D signal through which data can be transmitted using a large amount of resources. Meanwhile, a D2D discovery signal for recognizing whether a UE is located at a contiguous position may also have different subframe boundaries.

ii) As a second subframe RS transmission (Tx) time decision method, the subframe RS transmission time may be determined on the basis of the UL subframe boundary.

The RS transmitted by a UE may be transmitted at the UL subframe boundary at which the UE transmits the RS to the eNB, or may be transmitted at a specific position shifted from the UL subframe boundary by a predetermined time.

Figure 15:
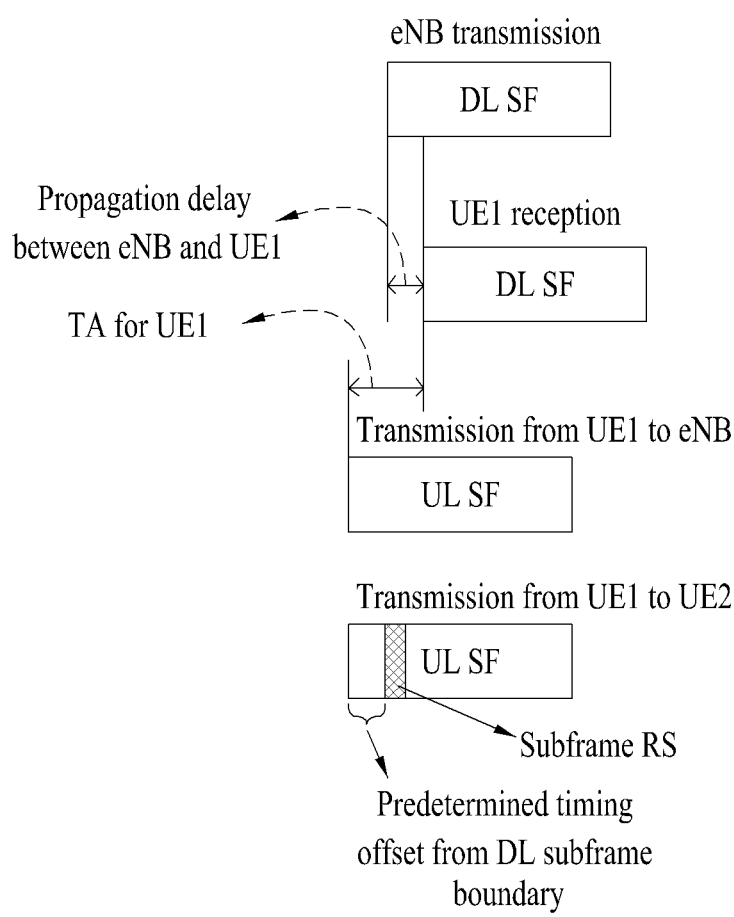
FIG. 15 is a conceptual diagram illustrating a method for determining a transmission (Tx) time of a subframe reference signal (RS) using a boundary of an uplink subframe according to a third embodiment of the present invention.

FIG. 15 is a conceptual diagram illustrating a method for determining a transmission (Tx) time of a subframe reference signal (RS) using a boundary of an uplink subframe according to a third embodiment of the present invention. In FIG. 15, it is assumed that UE1 located in the coverage transmits the subframe RS to UE2 located outside of the coverage.

The above-mentioned scheme is characterized in that the external UE of the coverage can acquire the UL subframe boundary of the internal UE of the coverage, such that the internal UE of the coverage can perform D2D communication with the external UE of the coverage, and at the same time can easily perform signal transmission to the eNB at another contiguous UL subframe. Specifically, the above-mentioned advantage may be considered effective in the FDD system in which all subframes of a specific frequency domain are set to the UL subframes. In this case, the DL subframes are separated from the UL subframes having D2D communication in the frequency domain, so that a guard period for DL reception shown in FIG. 14 need not be used.

In addition, if the subframe RS is transmitted in response to the UL subframe boundary, a subsequent D2D Tx/Rx signal may also be transmitted and received on the basis of the UL subframe boundary. Specifically, the subsequent D2D Tx/Rx signal may also be applied to the D2D signal through which data can be transmitted using a large amount of resources. Likewise, a D2D discovery signal for recognizing whether a UE is located at a contiguous position may also have different subframe boundaries.

iii) As a third subframe RS transmission (Tx) time decision method, the subframe RS transmission time may also be determined between the UL subframe boundary and the DL subframe boundary.

For example, the subframe RS transmission time may be set to a specific time earlier than the DL subframe boundary by a predetermined time corresponding to a half of a current TA value, or may also be set to a specific time spaced apart from the corresponding time by a predetermined time.

Figure 16:
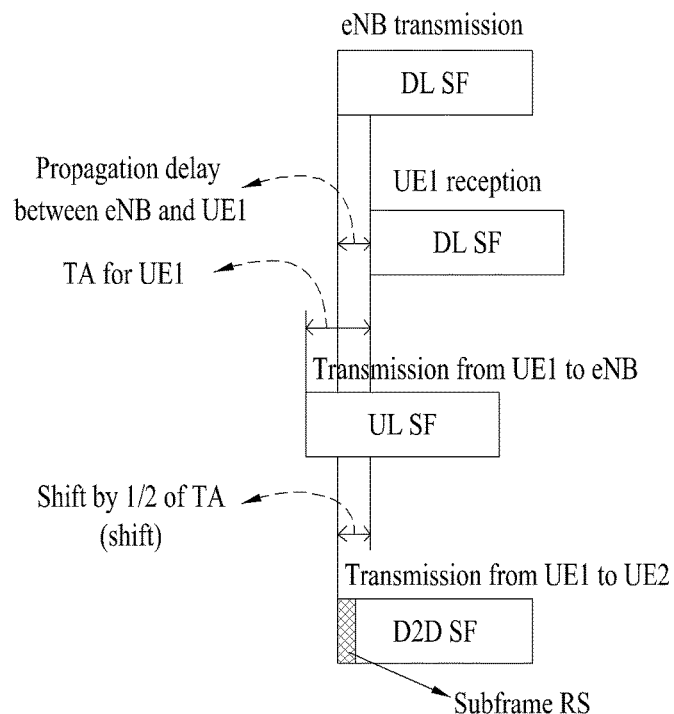
FIG. 16 is a conceptual diagram illustrating a method for determining a transmission (Tx) time of a subframe reference signal (RS) at a time between a boundary of an uplink subframe and a boundary of a downlink subframe according to a third embodiment of the present invention.

FIG. 16 is a conceptual diagram illustrating a method for determining a transmission (Tx) time of a subframe reference signal (RS) at a time between a boundary of an uplink subframe and a boundary of a downlink subframe according to a third embodiment of the present invention. Specifically, as can be seen from FIG. 16, a half of TA is approximately identical to a propagation delay between the eNB and the UE, so that a time earlier than the DL subframe boundary reception time by a predetermined time corresponding to the half of TA is identical to the transmission time at which the eNB transmits the DL subframe boundary, and is also identical to the reception time at which the eNB receives the UL subframe boundary.

Therefore, a specific time earlier than the DL subframe boundary reception time by a predetermined time corresponding to half the TA is approximately identical in all UEs belonging to the same cell. As a result, although any UE transmits the subframe RS, the subframe RS is transmitted at the approximately similar time points, so that the overall D2D subframe boundary remains unchanged even when several UEs alternately transmit the subframe RS.

In order to select one method from among the above-mentioned subframe RS transmission time decision methods, the eNB may inform the UE of a specific signal indicating which decision method will be used for transmission of the subframe RS. Alternatively, the respective methods have advantages in terms of different duplex methods, such that the corresponding method can be selected according to which duplex scheme is used by resources to be used for transmission of the subframe RS. For example, the TDD system may use the subframe RS transmission time decision method (i) based on the DL subframe boundary, and the FDD system may use the other subframe RS transmission time decision method (ii) based on the UL subframe boundary.

Alternatively, the subframe RSs having different attributes may also be transmitted in response to a plurality of subframe RSs. For example, in the case of using a discovery signal that is simultaneously transmitted/received by several UEs in response to synchronization, all UEs participating in transmission must have a common time, a UE may transmit the RS according to either the method (iii) for determining the subframe RS transmission time between the boundary of the UL subframe and the boundary of the DL subframe or the other method (i) for determining the subframe RS transmission time when there is little difference in propagation delay between UEs, and may transmit and receive the discovery signal on the basis of the RS transmission result. In contrast, when exchanging user data between individual UEs, the method (ii) for determining the subframe RS transmission time may be used according to a situation of each UE.

In this case, it is necessary for UEs to recognize which one of the time decision methods is used for transmission of the subframe RS, such that the subframe RSs transmitted according to different schemes (i.e., the subframe RSs for synchronization of different types of D2D signals) may be differentiated at the Tx signature, the positions of the transmitted time/frequency domains, or the like. For example, the signature of a specific subframe RS may be predefined in such a manner that the signature can be used only for the subframe RS for the discovery signal or can be used only for the subframe RS for D2D communication.

Fourth Embodiment

Meanwhile, if the UE located in the coverage (i.e., the internal UE of the coverage) receives an indication message of the subframe RS transmission from the eNB, the UE operation (specifically, collision with UL transmission toward the eNB) may occur in the corresponding resources.

In this case, transmission of the subframe RS may have priority. That is, when a UE configured to transmit the subframe RS at a specific subframe attempts to transmit a signal to the eNB at the same subframe, the signal to be transmitted to the eNB may be dropped and the subframe RS may then be transmitted.

Alternatively, signal transmission to the eNB may also have priority. That is, when a UE configured to transmit the subframe RS in a specific subframe attempts to transmit a signal to the eNB in the same subframe as the specific subframe, the RS transmission may be dropped and signal transmission to the eNB may then be carried out.

The above-mentioned methods may be used in different ways according to a method for indicating transmission of the subframe RS or according to categories of signals to be transmitted to the eNB. For example, assuming that the signal to be transmitted to the eNB is any one of a semi-statically transmitted semi-persistent scheduling (SPS) signal, a periodic CSI report, and a scheduling request signal to be independently transmitted by the UE, the eNB may not directly decide transmission of the corresponding time, so that the subframe RS may have priority. Specifically, the above-mentioned case may be more effectively used for the case in which the eNB directly indicates the subframe RS.

In another example, assuming that the signal to be transmitted to the eNB is a PDSCH indicated by a physical layer signal such as PDCCH or EPDCCH (Enhanced PDCCH), HARQ-ACK regarding an SPS-based PDSCH, an uplink grant, or a PHICH-based PUSCH transmission signal, signal transmission to the eNB may have priority. Upon receiving an indication message that commands the UE to competitively transmit the subframe RS, i.e., upon receiving an indirect indication message indicating transmission of the subframe RS, the subframe RS may also be transmitted at another time, such that signal transmission to the eNB may always have priority as necessary.

As described above, the subframe RS having been transmitted by the direct indication message or the indirect indication message of the eNB may be classified into the subframe RS being autonomously determined by the UE without receiving the indication message from the eNB, and the signature attributes. For example, a subset is selected from among all sets of the signature capable of being used as a signature of the subframe RS, and the signature corresponding to the corresponding subset may be defined to be transmitted by the UE only when direct/indirect indication messages of the eNB are present. Of course, an additional indicator may be used, and it may be possible to define an additional indicator for discriminating between the subframe RS having been transmitted without using the indication message of the eNB and the subframe having been transmitted by the indication message of the eNB. As a result, if a specific UE receives a specific subframe RS, it can be recognized whether the RS has been transmitted by the indication message of the eNB, i.e., it can be recognized whether the RS has been transmitted by the UE located in the eNB coverage. Based on the above-mentioned information, higher priority may be successively assigned to transmission of the RS of the UE located in the eNB coverage.

In addition, when the validation signal disclosed in the first embodiment is constructed, all or some of attributes of the subframe RS having been received by the UE may be reused. As a result, if the subframe RS is transmitted by the indication message of the eNB, the fact that the validation signal has been transmitted by the indication message of the eNB may be signaled to other UEs. Accordingly, a D2D UE, that has received the subframe RS transmitted by the validation signal or the eNB indication message, may retransmit the corresponding subframe RS without using additional UE-to-UE competition at a specific time, or may retransmit the corresponding subframe RS simultaneously while having priority in competition. Boundary information of the subframe used in the eNB may be propagated to the external UEs of the coverage.

Figure 17:
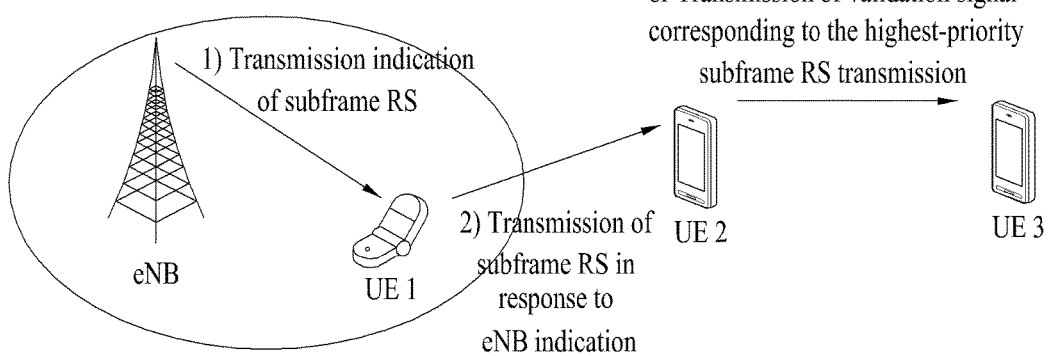
FIG. 17 is a conceptual diagram illustrating a method for propagating boundary information of a subframe used in eNB to UEs located outside of a coverage region according to a fourth embodiment of the present invention.

FIG. 17 is a conceptual diagram illustrating a method for propagating boundary information of a subframe used in eNB to UEs located outside of a coverage region according to a fourth embodiment of the present invention.

Referring to FIG. 17, the eNB may command a UE1 to transmit the subframe RS, and the UE1 may transmit the subframe RS according to the eNB indication message. UE2 may transmit the subframe RS having the highest priority from among the subframe RS received from UE1 and other subframe RSs, or may transmit the validation signal in response to transmission of the highest-priority subframe RS.

Through the above-mentioned propagation process, although UE3 does not directly perform D2D communication with the internal UE of the eNB coverage, the UE3 can be synchronized with the subframe of the eNB, such that the UE1 located in the coverage and the UE2 configured to perform D2D communication may be helpful to the D2D operation of the UE2.

In addition, when a first external UE of the coverage performs D2D communication in response to the subframe RS transmitted either by the first external UE or by a second external UE of the coverage, detection of the subframe RS transmitted by the internal UE of the coverage is attempted. If the subframe RS is detected, the first external UE may operate in response to the subframe RS transmitted by the internal UE of the coverage. For example, the coverage external UE having detected the subframe RS transmitted by the internal UE of the coverage may reconfigure the subframe time point in response to the RS transmitted by the coverage internal UE within a predetermined time. If the corresponding UE transmits the subframe RS, the RS may be transmitted in response to the reconfigured subframe time, or RS transmission of the corresponding UE may be stopped.

In addition, assuming that a valid period is present in the subframe RS that has been transmitted by the coverage external UE and used as a reference of the legacy D2D communication, synchronization with the subframe RS transmitted by the coverage external UE is maintained until the corresponding valid period expires. However, after the valid time has expired, synchronization with a start time of the subframe RS transmitted by the internal UE of the coverage is needed. Alternatively, it is expected that another subframe RS will be transmitted by the internal UE of the coverage within a predetermined time, and transmission of the subframe RS is not attempted during the corresponding predetermined time, such that priority may be assigned to the internal UE of the coverage. In this case, the coverage external UE that has not received the subframe RS during the predetermined time may attempt to transmit the subframe RS according to the above stochastic methods.

Meanwhile, according to the subframe RS transmission scheme based on UE-to-UE competition, priority for RS transmission may be differently assigned according to D2D UE categories. For example, UEs for D2D communication may be classified into some categories according to various kinds of information, for example, maximum Tx power of the D2D signal, information as to whether group communication is possible (i.e., whether one D2D UE can simultaneously perform D2D communication with a plurality of D2D UEs), and information as to whether other D2D links can be controlled. Specifically, control of another D2D link may indicate control of resource allocation regarding a contiguous D2D link in which the corresponding UE is not contained. In this case, priority may be differently assigned to transmission of the subframe RS according to D2D UE categories. Higher priority may be assigned to UE categories having higher function. For example, higher priority may be assigned to a UE having a higher maximum Tx power, a UE having group communication capability, or a UE having a control function of another D2D link, such that the corresponding UEs may establish the subframe reference at higher probability and other UEs may operate in response to the established reference.

In addition, although a UE acquires the subframe boundary according to the above-mentioned scheme, a new subframe boundary must be determined in response to the movement of D2D UEs, such that it is impossible for synchronization having been acquired once to be indefinitely valid. Therefore, a valid period is established in the subframe boundary having been decided once. After this valid period has expired, the subframe boundary may be re-established after completion of the subframe RS transmission process. In this case, assuming that UE-to-UE competition is performed for each subframe boundary reconfiguration time, an unnecessary time delay may occur due to UE-to-UE RS collision.

In order to address the above problem, priority may be assigned to a UE having transmitted the valid subframe RS when deciding the legacy subframe boundary. The method for assigning such priority may be identical to the method for assigning priority to the internal UE of the eNB coverage for use in the above-mentioned RS transmission priority assignment method. In addition, the UE having transmitted the valid subframe RS when deciding the legacy subframe boundary may be assigned priority by transmitting the validation signal irrespective of transmission of other subframe RSs.

A UE in which a new D2D link is activated may maintain the same subframe boundary as in legacy peripheral UEs performing the legacy D2D communication. For this purpose, the UE in which a new D2D link is activated does not transmit the subframe RS during a predetermined time, and may determine the presence or absence of the subframe RSs transmitted from the legacy D2D UEs.

In this case, the predetermined time in which no subframe RS is transmitted is set to a valid period of the subframe boundary determined once. If a UE performing the legacy D2D communication is located at an adjacent position, the subframe RS may be transmitted at least once within the predetermined time. If the UE in which the new D2D link is activated does not detect the valid subframe RS or the validation signal during the predetermined time, the UE may directly attempt to transmit the subframe RS.

Fifth Embodiment

Information regarding various parameters to be used in actual D2D communication may be contained in the subframe RS. As a result, UEs having received the same subframe RS may perform D2D communication using the same parameters. Parameters capable of being contained in the subframe RS are as follows.

(1) The Position and Size Information of a Frequency Domain in which D2D Communication Will be Executed.
  D2D communication may be achieved in a region corresponding to the above size information on the basis of a frequency domain having received the subframe RS.
(2) Transmission (Tx) Power Information to be Used for D2D Communication, for Example, Maximum Tx Power or Various Parameters Shown in a Tx Power Control Equation.
  If the legacy PUSCH Tx power control scheme shown in the following equation 1 is used between the eNB and the UE without change, parameters ($P_{O\_PUSCH,c}(j)$, $\alpha_c(j)$) are represented by the following equation 1.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} \quad \text{[Equation 1]}$$

In Equation 1, a unit of $P_{O\_PUSCH,c}(j)$ is dBm, and $P_{O\_PUSCH,c}(j)$ denotes PUSCH Tx power of a carrier (c) at the i-th time. Specifically, $P_{CMAX,c}(i)$ is maximum Tx power of a UE of the carrier (c), $PL_c$ is a pathloss estimation value of a downlink signal, $\alpha_c(j)$ and $10 \log_{10}(M_{PUSCH,c}(i))$+ $P_{O\_PUSCH,c}(j)$ denote parameters on the basis of a higher layer signal of the carrier (c) at the i-th time, attributes of data to be transmitted at the i-th time, the amount of allocated resources, etc. The parameters may correspond to the open-loop power control. Finally, $f_c(i)$ is a power control value of the i-th time decided by information contained in a closed-loop power control message received from the eNB, and may correspond to a parameter for closed-loop power control.

(3) Length Information of Cyclic Prefix (CP) to be Used for D2D Communication
  This length information (3) may indicate whether a normal CP or an extended CP will be used, or may indicate whether a new-length CP will be used on the condition that the new-length CP is additionally introduced for D2D communication.
(4) Length of a Time Unit of a Single D2D Transmission
  This length information (4) may indicate whether a single D2D Tx signal is transmitted using one subframe as a time reference, may indicate whether a single D2D Tx signal is transmitted using several concatenated subframes as a single time reference, or may indicate the number of concatenated subframes when several subframes are concatenated.
(5) Contention Parameters for D2D Signal Transmission
  If UEs transmit a D2D signal on the basis of contention, the contention parameters are parameters to be used for contention. For example, the contention parameters may include a transmission (Tx) probability value to be used when each UE stochastically transmits the D2D signal at each Tx time. In another example, each UE generates/stores random numbers within a predetermined region, and subtracts a predetermined value from the random numbers whenever a channel is empty. If the subtraction result is equal to or less than a predetermined reference, the contention parameters may include information regarding a generation region of random numbers to be used when transmission is performed.

As a representative example of the method for including such information in the subframe RS, when the signature of the subframe RS is generated, the parameter values may be used as variables. Alternatively, an additional channel for transmitting the above information using constant time/frequency domains derived from the corresponding signature may be formed separately from the signature of the subframe RS. For example, the above-mentioned information may be transmitted only during a predetermined time after transmission of the signature, and the above-mentioned information may be transmitted through a channel transmitted using the same frequency domain as in the signature.

The above-mentioned information may be set to a specific value contained in the eNB indication when the corresponding UE transmits a channel having the subframe RS or the above information upon receiving the eNB indication message. In contrast, if the channel having the subframe RS or the above information is transmitted without receiving the eNB indication message at the outside of the eNB coverage or without receiving the subframe RS initiated by the eNB indication at the outside of the eNB coverage, the above-mentioned information may be set to a kind of default value of each UE. That is, the UE may have a default value corresponding to various kinds of information during transmission of the subframe RS. If the subframe RS is transmitted according to the eNB indication, this default value may be changed to a value received from the eNB.

Figure 18:
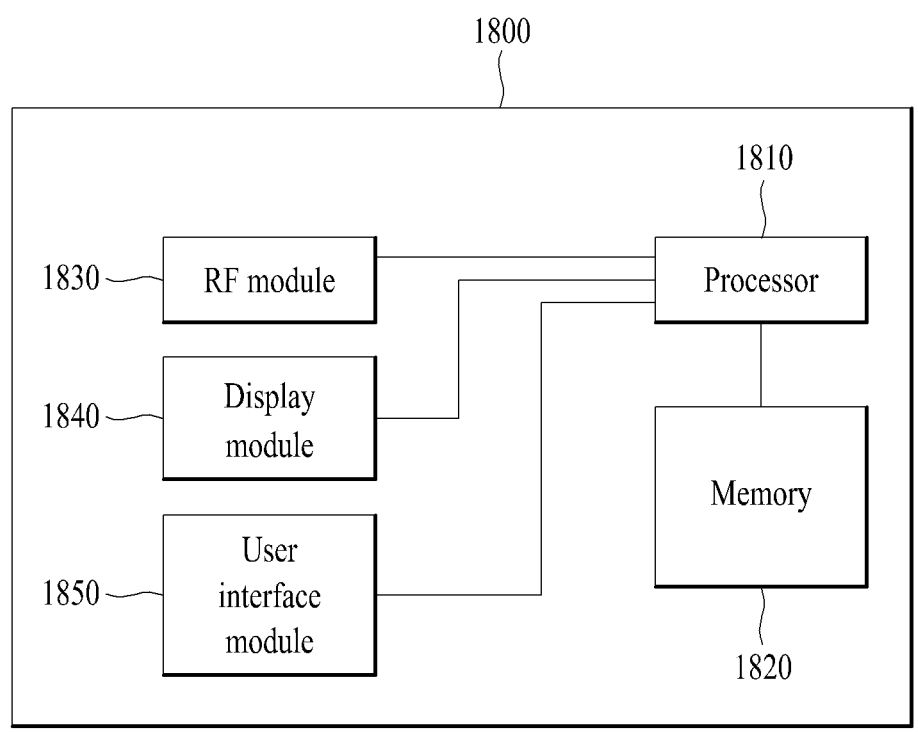
FIG. 18 is a block diagram of a communication apparatus according to an embodiment of the present invention.

FIG. 18 is a block diagram for an example of a communication device according to one embodiment of the present invention.

Referring to FIG. 18, a communication device 1800 may include a processor 1810, a memory 1820, an RF module 1830, a display module 1840, and a user interface module 1850.

Since the communication device 1800 is depicted for clarity of description, prescribed module(s) may be omitted in part. The communication device 1800 may further include necessary module(s). And, a prescribed module of the communication device 1800 may be divided into subdivided modules. A processor 1810 is configured to perform an operation according to the embodiments of the present invention illustrated with reference to drawings. In particular, the detailed operation of the processor 1810 may refer to the former contents described with reference to FIG. 1 to FIG. 17.

The memory 1820 is connected with the processor 1810 and stores an operating system, applications, program codes, data, and the like. The RF module 1830 is connected with the processor 1810 and then performs a function of converting a baseband signal to a radio signal or a function of converting a radio signal to a baseband signal. To this end, the RF module 1830 performs an analog conversion, amplification, a filtering, and a frequency up conversion, or performs processes inverse to the former processes. The display module 1840 is connected with the processor 1810 and displays various kinds of informations. And, the display module 1840 can be implemented using such a well-known component as an LCD (liquid crystal display), an LED (light emitting diode), an OLED (organic light emitting diode) display and the like, by which the present invention may be non-limited. The user interface module 1850 is connected with the processor 1810 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As is apparent from the above description, although the method and apparatus for acquiring synchronization for D2D direct communication between a user equipment (UE) located inside a coverage region and a user equipment (UE) located outside the coverage region in a wireless communication system have been disclosed on the basis of application to 3GPP LTE, the inventive concept of the present invention is applicable not only to 3GPP LTE, but also to other wireless communication systems.

The invention claimed is:

1. A method for receiving synchronization signals for a Device-to-Device (D2D) link at a user equipment (UE) in a wireless communication system, the method comprising;
   receiving the synchronization signals from other UEs,
   selecting one of the synchronization signals based on priorities of the signatures included in the synchronization signals; and
   obtaining a synchronization using the selected synchronization signal,
   wherein each of the signatures belongs to one of a first group for an in-coverage of a base station or a second group for an out-of-coverage of the base station, and
   wherein, if at least one of the synchronization signals is transmitted by an instruction of the base station, the at least one synchronization signal includes a signature belonging to the first group.

2. The method of claim 1, wherein the priorities of signatures belonging to the first group are higher than priorities of signatures belonging to the second group.

3. The method of claim 1, wherein the at least one synchronization signal is transmitted in advance by a predetermined timing from a downlink subframe boundary.

4. A user equipment (UE) in a wireless communication system, the UE comprising:
   a Radio Frequency (RF) module to receive synchronization signals for a Device-to-Device (D2D) link from other UEs; and
   a processor to select one of the synchronization signals based on priorities of the signatures included in the synchronization signals and to obtain a synchronization using the selected synchronization signal,
   wherein each of the signatures belongs to one of a first group for an in-coverage of a base station and a second group for an out-of-coverage of the base station, and
   wherein, if at least one of the synchronization signals is transmitted by an instruction of the base station, the at least one synchronization signal includes a signature belonging to the first group.

5. The UE of claim 4, wherein the priorities of signatures belonging to the first group are higher than priorities of signatures belonging to the second group.

6. The UE of claim 4, wherein the at least one synchronization signal is transmitted in advance by a predetermined timing from a downlink subframe boundary.

* * * * *